UNITED STATES PATENT OFFICE

2,133,759

COMPOSITIONS FOR AND PROCESS OF MAKING SUSPENSIONS

James G. Vail, Media, and Chester Leon Baker, Penn Wynne, Pa., assignors to Philadelphia Quartz Company, Philadelphia, Pa., a corporation of Pennsylvania No Drawing. Application January 30, 1936, Serial No. 61,632

20 Claims. (Cl. 255—1)

This invention relates to compositions for and processes of making suspensions; and it includes certain suspension-forming compositions comprising a water soluble alkali metal silicate and a dispersible solid in proportions suitable for making suspensions and also containing, if desired, a peptizing agent; and our invention also comprises processes of making suspensions by the use of said suspension-forming compositions, wherein such a powder is admixed with water in suitable proportions to produce a substantially stable suspension, which suspension may have the characteristics of a water paint, an adhesive, an oil well drilling fluid or the like; all as more fully hereinafter set forth and as claimed.

In a copending application, Serial No. 61,633 we have disclosed and claimed certain electrolyte-containing suspensions and methods for producing the same, said methods comprising mixing a dispersible solid with a liquid vehicle, deflocculating said solid in said vehicle, usually by the use of a peptizing agent, and adding sodium silicate thereto in concentrations normally having a flocculating or precipitating action on said suspension. This acknowledged application also discloses that small concentrations of an alkali metal silicate may be used to produce the necessary preliminary deflocculation of the solid in making up these suspensions. The alkali metal silicate can, of course, be added either in the form of its solution or in the form of a water soluble powder. The present invention represents, in some respects, an improvement over the invention of our acknowledged application, in that it comprises a simpler method of producing the preferred type of suspension.

We have found that it is possible to prepare dry, powdered compositions comprising a dispersible solid in admixture with a water soluble alkali metal silicate, these compositions also containing a peptizing or deflocculating agent, if desired, and having the property of forming substantially stable suspensions by simple admixture with water. We have found it advantageous to employ a slowly soluble alkali metal silicate in order that this silicate may serve as a peptizing agent as it dissolves, the concentration of silicate remaining in the peptizing range for a sufficient time to produce the desired deflocculation of the solid. Ultimately the concentration of silicate in the resulting suspension reaches the point where it would normally have a flocculating or precipitating action on the suspended solid but this tendency to precipitate is rendered substantially ineffective by the resulting character of the suspension. The use of an auxiliary peptizing agent enables the use of more readily soluble silicates in our compositions.

The compositions of the solid silicates of soda which will give the desired results vary over wide limits. In general, silicate of soda glasses in which the percentage ratio of silicon dioxide to sodium oxide lies between 1.5 and 4, give satisfactory results. Hydrous silicate of soda powders in which the proportion of silicon dioxide to sodium oxide lies in the general range between 2 and 4, are satisfactory. The crystalline silicates of soda such as the various hydrates of sodium metasilicate and sodium sesquisilicate, however, are not generally satisfactory, in compositions which do not contain a quickly effective peptizing agent, for the reason that they dissolve too rapidly to permit the preliminary deflocculation of the clay. The silicate of soda used in any particular preparation is preferably ground to a powdery condition before use.

As indicated above, it is possible to employ powdered sodium silicates having widely varying properties so far as water solubility is concerned. The rate of solution of these powders can be varied, of course, by the temperature of the water with which they are mixed, as well as by particle size, etc. In our process use is made of the unexpected phenomenon that alkali metal silicates are more quickly soluble in aqueous suspensions than in water alone. The cause for this phenomenon is probably to be found in the fact that there is less opportunity for the alkali to be leached out of the silicates owing to the lack of circulation in the suspensions. This increased solubility is of assistance in that a silicate having a somewhat larger proportion of $SiO_2$ can be employed than would otherwise be possible.

We have found that, when silicates are employed having percentage ratios of $SiO_2$ to $Na_2O$ greater than about 2:1, it is usually preferred to heat the mixture in order to effect complete solution. When a powdered hydrous silicate of soda has been employed, complete solution usually takes about 24 hours at room temperature. If room temperature is to be employed it is advantageous to so select the silicate that it will dissolve completely within from about 18 to 48 hours. This rate of solution will afford sufficient time to effect peptization of the solid while the silicate concentration is within the peptizing range. One convenient way of making suspensions in accordance with this invention comprises mixing one of the powdered compositions with water, allowing this mixture to stand until peptization has occurred and then heating to quickly effect final solution of the silicate.

It will be apparent that our present method has all the advantages found in the method of our acknowledged application together with certain added advantages. Our present method, for example, includes the preparation of dry suspension-forming compositions which can be stored and shipped in relatively cheap containers such as paper bags. This represents an important commercial advantage since wet mixtures and silicate of soda solutions must be stored and shipped in expensive steel containers. Suspensions can be prepared for use when and where desired, merely by mixing our dry compositions with the proper amount of water and effecting solution of the silicate of soda. The method is substantially fool proof since the silicate of soda and the colloidal clay or other solid are already present in correct proportions. It is only necessary to gage the amount of water to be added, the other constituents being present in proper proportions. After the water is added and admixed it is only necessary to allow the mixture to stand for a sufficient length of time to effect solution of the silicate. One of the few precautions to be taken is that all of the dry preparation to be used should be added at once to the water. If part should be added to the water and then the mixture allowed to stand until solution of the silicate had taken place, the concentration of silicate then present would be sufficient to exert a flocculating action upon any of the composition that was added subsequently. It is not necessary that all of the water be added immediately since the rate of solution of the silicate is largely independent of the amount of water which happens to be present; at least within certain limits.

The advantages which are obtained by our invention, over other methods of making aqueous suspensions, can be readily demonstrated by means of two simple experiments. In one experiment, which represents the method which would be employed ordinarily by workmen who had been given the materials required for the making of a suspension, we mixed 418 parts of a silicate of soda solution, containing 37 parts of sodium oxide, 74 parts of silicon dioxide and 307 parts of water, with 32 parts of finely ground California bentonite. The resulting mixture was allowed to cure 24 hours at 80° C. The physical properties of this mixture were then measured at 30° C. and found to be as follows:

Viscosity _____ centipoises__ 12
Gel strength _____ units__ 10
Supernatant clear liquor separated after 24 hours' standing _____ per cent__ 8

In making another suspension having a chemical composition identical to that prepared above, but employing our improved method of preparation, we mixed 111 parts of finely ground silicate of soda glass, containing 37 parts of sodium oxide and 74 parts of silicon dioxide, with 32 parts of California bentonite. This dry mixture was then stirred into 307 parts of water and the resulting suspension was allowed to cure at 80° C. for 24 hours. The physical properties of this suspension were then measured at 30° C. and found to be as follows:

Viscosity _____ centipoises__ 284
Gel strength _____ units__ 290
Supernatant clear liquor separated after 24 hours' standing _____ None It will be noted, in comparing the properties of the two suspensions prepared above, that the suspension prepared by the method of the present invention had roughly 25 times the viscosity and the gel strength and a substantially greater stability. Our suspensions are characterized by having high values of these properties.

The explanation for the difference in properties of the two suspensions is probably to be found in the fact that, in making the suspensions by the method of the present invention, the silicate of soda went into solution gradually and served to peptize or deflocculate the bentonite while at low concentrations. Alkali metal silicates, at concentrations of the order of from 0.1 to 10 per cent by weight, have a well defined deflocculating action upon various finely divided solids. It is therefore believed that, as the silicate passes through this particular concentration range in our method, it serves to deflocculate the finely divided solid, thus producing a suspension of greatly increased stability, viscosity and gel strength. While we do not wish to be limited to this theory of action of our invention, it appears to be the most logical explanation to account for the difference in properties of the two suspensions prepared above. This is indicated further by the results obtained in our acknowledged copending application.

The greater viscosity, gel strength and freedom from segregation by settling which can be obtained by means of the present invention are important in clay-silicate of soda adhesives, in water paints, in oil well drilling muds, etc. Through the use of our method it is possible in many cases to obtain the desired physical characteristics in a suspension with a smaller amount of clay and thus effect savings which may amount to as much as 50 per cent or more. In some cases our method permits the use of a cheaper grade of clay. In other cases such as in water paints, for example, where the amount of clay permissible in the product is limited by its use, our process may permit the substitution of clay for more expensive materials.

The variety and number of products which can be prepared by our method is, of course, very great. Our invention is useful in making adhesives, cosmetics, enamel slips, water paints and oil well drilling fluids, for example. Many other industrial applications will become evident from a consideration of the following specific examples which represent illustrative embodiments of the manufacture of certain commercial preparations.

*Example 1.—Oil well drilling mud*

One thousand parts of a silicate of soda glass containing 33 per cent $Na_2O$ and 66 per cent $SiO_2$ ($\%SiO_2/\%Na_2O=2$), which was ground to pass a 200 mesh sieve, was intimately mixed with 202 parts of finely ground California bentonite. The dry mixture was then stirred into 2800 parts of water. The solution of the silicate of soda was effected by allowing the mixture to stand for a day at 80° C. The suspension which resulted was found to have the following properties:

Viscosity _____ centipoises__ 117
Gel strength _____ units__ 130
Supernatant clear liquor after 24 hours' standing _____ None The dry powdered mixture of sodium silicate and bentonite employed in making the above drilling fluid can be prepared in the field and stored until needed or it may be pre-mixed and shipped to the point at which the finished mud is to be used. Weighting agents can be added. While solution of the silicate of soda can be hastened by heating the mud, this may be accomplished at ordinary atmospheric temperatures upon longer standing. In either case the finished mud will be found to have a consistency suitable for use in the rotary drilling of oil wells.

In the making of oil well drilling fluids we have found it advantageous to employ a powdered silicate of soda in which the ratio of silicon dioxide to sodium oxide lies between 1.5:1 and 4:1. Either powdered silicate of soda glasses or powdered hydrous silicates of soda are suitable for this purpose. While the proportions of powdered silicate of soda to clay will vary with the type of clay being used, the mixtures that have been found most satisfactory have comprised 10 to 50 parts of powdered clay mixed with 100 parts of powdered silicate of soda. In general, the more bentonitic or colloidal the clay used, the smaller the amount required.

In our acknowledged copending application we have explained some of the requirements which must be met by a given suspension in order that it should be suitable as an oil well drilling mud. The presence of silicates of soda in such a mud has been found advantageous for the purpose of reducing the difficulties encountered with the so-called heaving shale. The silicate of soda produces a mud having the property of flocculating any colloidal clays with which it comes in contact. By means of our process drilling fluids can be prepared which contain a smaller amount of clay than would otherwise be required. This appreciably reduces the cost of these muds.

Example 2.—Adhesive

In making up an adhesive by our method, we took 300 parts of a powdered hydrous silicate of soda containing approximately 19.4 per cent $Na_2O$, 62.5 per cent $SiO_2$ and 18 per cent water and mixed it thoroughly with 40 parts of finely ground California bentonite. This mixture was then stirred into 450 parts of water and allowed to stand for a few hours to effect solution of the silicate. The resulting suspension was found to be suitable for use as an adhesive in making up either corrugated or solid paper box board, for example.

The suspension prepared in the above manner was found to have the following properties:

Viscosity_____centipoises__ 155
Gel strength _____units__ 107
Supernatant clear liquor after 24 hours' settling_____ None In the preparation of adhesives by our method we have found it advantageous to employ a silicate in which the ratio of $SiO_2$ to $Na_2O$ ranges from about 2.5:1 to 4:1. Anhydrous glasses of this composition, even when finely divided, dissolve better at elevated temperatures. When they are used in the dry mixture with clay it becomes desirable therefore to use hot water in making up the liquid adhesive. In those cases where it is undesirable or inconvenient to use heat in making up the liquid adhesive, it is possible to arrive at the same result by using a powdered hydrous silicate, such as that produced by partially drying a solution of silicate of soda.

The amount of silicate of soda required in the finished adhesive will vary with the use to which it is to be put, but in general the total dissolved $SiO_2$ plus $Na_2O$ will lie within the limits of 20 to 40 per cent. The amount of clay required will also vary with the type of clay used and the conditions under which the adhesive is to be used, but will usually lie between 5 and 25 per cent of the weight of finished liquid adhesive.

The making of adhesives by our process is highly flexible. The quantity of water can, of course, be varied with each batch to be made up. And it is relatively easy to admix additional clay or silicate with the dry composition of our invention if it is desired to vary the ratio of clay to silicate. Variations in the amount of water, in the ratio of clay to silicate and in the type of silicate employed will lead to clay-silicate of soda adhesives having substantially any desired properties, these variations being within the skill of the art.

Example 3.—Water paint

In making a dry mix suitable for the formation of a water paint, we took 70 parts of iron oxide pigment, 4 parts of Wyoming bentonite, 0.1 part of sodium tannate and 47 parts of a silicate of soda glass which contained 23.5 per cent $Na_2O$ and 76 per cent $SiO_2$, and which had been previously ground to pass a 200 mesh sieve. These powdered materials were thoroughly mixed together. When our dry mix was stirred into 178 parts of water and this mixture heated for several hours, a good quality water paint was obtained. This water paint did not settle out upon long storage. When brushed out on a hard surface it dried to a hard, attractive, non-dusting film.

It will be noted that the water paint formed above was a stable suspension which is in contrast to the water paints of the prior art which, in general, are mixed just prior to use since standing permits the pigment to settle. It will also be noted that a special peptizing agent is employed in above dry mix. This agent assists in the deflocculation of the solids and produces a resulting suspension of greater stability.

It will be obvious to anyone skilled in the art that the processes of the above specific examples can be varied widely without departing from the spirit of the present invention. In its broad scope the process of our invention comprises mixing together a finely divided dispersible solid and a powdered, water soluble alkali metal silicate, with the addition of a peptizing agent, if desired, and admixing the resulting dry mix with water in suitable proportions to produce a substantially stable suspension. The compositions of our invention comprise dry powdered mixtures of finely divided dispersible solids, such as colloidal clays, for example, with powdered alkali metal silicates, these mixtures sometimes also containing agents having the property of peptizing or deflocculating the said solids when admixed with water. In the absence of a peptizing agent it is advantageous to employ an alkali metal silicate having a rate of solubility sufficiently slow to produce concentrations within the peptizing range for a time sufficient to peptize the solids during admixture of the composition with water.

In our invention is is possible to employ any of the alkali metal silicates which are available or can be produced in dry powdered form having a rate of solubility of the proper order. These silicates can be mixed with finely divided dispersible solids in any suitable proportions, although these compositions should ordinarily contain at least about 10 per cent by weight of the alkali metal silicate in order that the silicate should produce a well defined effect in the resulting suspension.

While the use of an auxiliary peptizing agent is not required in our invention its presence produces a suspension of improved stability. When rapidly soluble silicates are employed it is important that a more rapidly soluble peptizing agent be present. Of course there are many types of such agents which can be employed. Alkalis in dilute solution act as deflocculating agents and in our invention it is possible to employ alkalis, advantageously those which are stable under atmospheric conditions, such as soaps, sodium carbonate, sodium phosphate and sodium bi-carbonate, for example. Bark extracts and tanning agents can be employed, as well as salts of these products, examples being quebracho, tannin, sodium tannate, gallic acid, sodium gallate, etc. These agents, all of which possess the property of lowering the viscosity and gel strength of the usual aqueous clay suspensions when added thereto in the absence of substantial concentrations of electrolytes, should be used in small proportions amounting, in most cases to not substantially over 1 per cent based on the weight of the final suspension.

Many different solids can be suspended within the scope of our invention. Solids can be suspended which have properties totally different from those of clay, such as carbon black, for example. Colloidal clays can be mixed with minerals, pigments or other solids which are ordinarily difficult to retain in suspension. The range of stable suspensions which our invention is capable of producing is thus very large. Various ways of dry mixing the solids with the alkali metal silicates can be employed. It is advantageous to grind these constituents together. The more finely divided the solid the more stable the suspension produced. And various methods of mixing the dry preparations with water can be used. One of the advantages of our invention is that stable suspensions can be produced by simple mixing or stirring methods. It is not necessary to employ any expensive mixing equipment, such as the so-called colloid mills, for example, but such equipment can be used if desired. Other modifications within the scope of the following claims will be immediately evident to those skilled in the art.

What we claim is:

1. In the manufacture of suspensions suitable for use in making water paints, adhesives, oil well drilling fluids and the like, the process which comprises dry mixing a finely-divided, dispersible clay with a slowly-soluble, solid alkali metal silicate having a percentage ratio of $SiO_2$ to alkali metal oxide ranging between about 1.5:1 to 4:1, in amount sufficient to normally produce a flocculating action upon said clay when completely dissolved in water; the said silicate having a rate of solution below that of solid sodium metasilicate and of solid sodium sesquisilicate; and mixing the resulting dry mix with water under conditions producing peptization of said clay prior to complete solution of said silicate, thereby forming a substantially stable suspension of said clay.

2. The process of claim 1 wherein the slowly-soluble silicate is employed in proportions amounting to over 10 per cent by weight based on the clay present.

3. The process of claim 1 wherein the slowly-soluble silicate is in the form of a powdered silicate of soda glass.

4. The process of claim 1 wherein the slowly-soluble silicate is in the form of a hydrous powdered silicate of soda.

5. The process of claim 1 wherein the slowly-soluble silicate is one capable of dissolving substantially completely in water at ordinary temperatures within a period of about 18 to 48 hours.

6. The process of claim 1 wherein a pigment is included in the mixture and the components of the suspension are present in proportions suitable for making a water paint.

7. The process of claim 1 wherein the components of the suspension are present in proportions suitable for making an adhesive.

8. The process of claim 1 wherein a weighting agent is included in the mixture and the components of the suspension are present in proportions suitable for making an oil well drilling fluid.

9. In the manufacture of suspensions suitable for use in making water paints, adhesives, oil well drilling fluids and the like, the process which comprises dry mixing a finely-divided, dispersible clay with not substantially more than 1 per cent by weight of a water soluble peptizing agent and with at least about 10 per cent by weight of a finely-divided, solid alkali metal silicate, having a percentage ratio of $SiO_2$ to alkali metal oxide ranging between about 1.5 to 4.0, the solubility relations between said peptizing agent and said silicate being such as to produce peptization of the clay upon the addition of water to said dry mix prior to complete solution of said silicate, and mixing the resulting dry mix with water, thereby forming a substantially stable suspension of said clay.

10. The process of claim 9 wherein the said peptizing agent is an organic peptizing agent and wherein the solid silicate is one capable of dissolving substantially completely in water at ordinary temperatures within a period of about 18 to 48 hours.

11. The process which comprises adding to water a dry mixture of a finely-divided, dispersible clay and at least 10 per cent by weight of a slowly-soluble solid silicate of soda, mixing and maintaining the mixture under conditions producing partial solution of said silicate and silicate concentrations causing the peptization of said clay, then heating the mixture to produce complete and rapid solution of the remaining silicate.

12. In the process of making stable aqueous suspensions of finely-divided clays containing alkali metal silicates in concentrations over 10 per cent by weight based on the clay present, the step which comprises gradually building up the concentration of alkali metal silicate in such a suspension, the rate of increase being such that said concentrations remain within the peptizing range of from about 0.1 to 10 per cent by weight for a time sufficient to produce a peptizing action on the suspended clay.

13. The process which comprises dry mixing a finely-divided, dispersible clay with at least 10 per cent by weight of a slowly-soluble, solid silicate of soda having a ratio of $SiO_2$ to $Na_2O$ ranging from about 1.5:1 to 4:1 in proportions suitable for making an oil well drilling fluid, then mixing said dry mix with sufficient water to produce said drilling fluid and maintaining conditions in such manner that the concentration of the slowly dissolving silicate of soda will remain within the peptizing range of from about 0.1 to 10 per cent by weight for a time sufficient to produce peptization of said clay prior to complete solution of said silicate.

14. A self-peptizing, suspension-forming dry composition comprising a finely-divided dispersible clay and at least about 10 per cent by weight of a slowly soluble solid alkali metal silicate having a ratio of $SiO_2$ to alkali metal oxide ranging from about 1.5:1 to 4:1 and having a rate of solubility below that of solid sodium metasilicate and of solid sodium sesquisilicate, said rate of solubility being such as to produce peptization of said clay prior to complete solution of said silicate upon admixture of said dry composition with water.

15. The composition of claim 14 wherein a pigment is present and the components are present in suitable proportions to make a water paint upon the addition of water.

16. The composition of claim 14 wherein the components are present in suitable proportions to make an adhesive upon the addition of water.

17. The composition of claim 14 wherein a weighting agent is present and the components are present in suitable proportions to make an oil well drilling fluid upon the addition of water.

18. Self-peptizing, suspension-forming dry compositions suitable for use in making up oil well drilling fluids comprising about 10 to 50 parts of a finely-divided dispersible clay and about 100 parts of a slowly-soluble, solid silicate of soda having a ratio of $SiO_2$ to $Na_2O$ ranging from about 1.5:1 to 4:1, the said silicate having a rate of solubility below that of sodium metasilicate and of solid sodium sesquisilicate, said rate of solubility being such as to produce peptization of said clay prior to complete solution of said silicate upon admixture of said dry compositions with water.

19. A process of preparing an oil well drilling fluid which comprises mixing a slowly-soluble, solid silicate of soda, having a ratio of $SiO_2$ to $Na_2O$ ranging from about 1.5:1 to 4:1, with a finely ground clay in the proportions of about 100 parts of the silicate of soda to from 10 to 50 parts of the clay, and then mixing in sufficient water to produce an oil well drilling fluid under conditions producing silicate concentrations within the peptizing range of about 0.1 to 10 per cent by weight for a time sufficient to peptize said clay prior to complete solution of said silicate of soda.

20. A self-peptizing, suspension-forming dry composition comprising a finely-divided dispersible clay, at least about 10 per cent by weight of a solid alkali metal silicate having a ratio of $SiO_2$ to alkali metal oxide ranging from about 1.5:1 to 4:1 and a water-soluble peptizing agent in amount not substantially exceeding 1 per cent by weight, the solubility relations between said peptizing agent and said silicate being such as to produce peptization of the clay upon the addition of water to said dry composition prior to complete solution of the silicate.

JAMES G. VAIL.
CHESTER L. BAKER.